United States Patent [19]

Reedy et al.

[11] Patent Number: 5,817,261
[45] Date of Patent: *Oct. 6, 1998

[54] PROCESS FOR PRODUCING ALKENYL AROMATIC FOAMS USING A COMBINATION OF ATMOSPHERIC AND ORGANIC GASES AND FOAMS PRODUCED THEREBY

[75] Inventors: Michael E. Reedy, Keyport, N.J.; Edward W. Rider, Jr., Slate Hill, N.Y.

[73] Assignees: Reedy International Corp., Keyport, N.J.; Genpak Corporation, Glen Falls, N.Y.

[ * ] Notice: The term of this patent shall not extend beyond the expiration date of Pat. No. 5,595,694.

[21] Appl. No.: 702,922

[22] Filed: Aug. 26, 1996

Related U.S. Application Data

[63] Continuation of Ser. No. 163,010, Dec. 7, 1993, Pat. No. 5,595,694, which is a continuation of Ser. No. 995,289, Dec. 22, 1992, Pat. No. 5,269,987.

[51] Int. Cl.$^6$ .................................................... B29C 44/20
[52] U.S. Cl. ................................ 264/54; 264/50; 264/53; 521/79; 521/139
[58] Field of Search ............................ 264/51, 45.9, 53, 264/54, 50; 521/79, 139

[56] References Cited

U.S. PATENT DOCUMENTS

| | | |
|---|---|---|
| 4,421,866 | 12/1983 | Suh et al. . |
| 4,424,287 | 1/1984 | Johnson et al. ............................ 264/50 |
| 4,446,253 | 5/1984 | Hahn et al. . |
| 4,451,417 | 5/1984 | Akiyama et al. . |
| 4,455,272 | 6/1984 | Schubert et al. . |
| 4,628,072 | 12/1986 | Shiraki et al. ............................ 525/57 |
| 4,636,527 | 1/1987 | Suh et al. . |
| 4,772,441 | 9/1988 | Voss et al. . |
| 4,840,976 | 6/1989 | Weber et al. . |
| 4,912,140 | 3/1990 | Tusim . |
| 5,000,891 | 3/1991 | Green . |
| 5,106,882 | 4/1992 | Suh et al. . |
| 5,110,837 | 5/1992 | Harderode et al. . |
| 5,149,473 | 9/1992 | Leduc . |
| 5,149,721 | 9/1992 | Ishikawa et al. . |
| 5,166,221 | 11/1992 | Hahn et al. . |
| 5,210,105 | 5/1993 | Paquet et al. . |
| 5,250,577 | 10/1993 | Welsh . |
| 5,269,987 | 12/1993 | Reedy et al. .............................. 264/50 |
| 5,324,458 | 6/1994 | Leduc . |
| 5,334,337 | 8/1994 | Voelker et al. . |
| 5,422,378 | 6/1995 | Vo ............................................. 264/50 |
| 5,595,694 | 1/1997 | Reedy et al. .............................. 264/50 |

FOREIGN PATENT DOCUMENTS

| | | |
|---|---|---|
| 2903495 | 7/1980 | Germany . |
| 51-007068 | 1/1976 | Japan . |
| 61-047810 | 3/1986 | Japan . |
| 356153 | 12/1972 | U.S.S.R. . |
| 444685 | 12/1974 | U.S.S.R. . |

*Primary Examiner*—Allan R. Kuhns
*Attorney, Agent, or Firm*—Rogers & Wells LLP

[57] ABSTRACT

There is disclosed a process for producing alkenyl aromatic foams utilizing a combination of atmospheric and organic gases as blowing agent, preferably using greater than 30% by weight of atmospheric gas, and preferably also using a predetermined about of a masterbatch mix comprising a styrenic polymer, a rubbery block copolymer, and a solid blowing agent. Also disclosed are alkenyl aromatic foams produced by the process which exhibit increased densities, increased thermoforming capabilities, increased post-expansion properties, and increased retainment of the atmospheric and organic gases.

18 Claims, No Drawings

PROCESS FOR PRODUCING ALKENYL AROMATIC FOAMS USING A COMBINATION OF ATMOSPHERIC AND ORGANIC GASES AND FOAMS PRODUCED THEREBY

This is a continuation application of application Ser. No. 08/163,010, filed Dec. 7, 1993, now U.S. Pat. No. 5,595,694 which, in turn, is a continuation application of application Ser. No. 07/995,289, filed Dec. 22, 1992, now U.S. Pat. No. 5,269,987.

FIELD OF THE INVENTION

This invention relates to a process for producing alkenyl aromatic foams utilizing a combination of atmospheric and organic gases as blowing agents, preferably also using a predetermined amount of masterbatch mix. The invention also relates to alkenyl aromatic foams resulting from the process, and articles made therefrom. Preferably, the alkenyl aromatic is polystyrene. The process and resulting foams of the present invention are conferred with several benefits among which are an increase in the production rate of the process, a reduction in the amount of organic gas which must be used in the process in order to obtain a foamed product having a given density, an increase in the thermoforming output of the foams due to, inter alia, an increase in the post-expansion properties of the foams, and an increase in retainment of the atmospheric and organic gases in the foamed product.

BACKGROUND OF THE INVENTION

A variety of normally gaseous or liquid blowing agents have been proposed for olefinic or styrenic polymers, including virtually all of the common atmospheric gases and lower hydrocarbons.

Alkenyl aromatic foams, particularly polystyrene foams in sheet form, are presently being made from a number of blowing agents which have many undesirable characteristics. Volatility, flammability, poor thermoforming qualities, brittle physical properties, high cost, or an adverse affect to the ozone layer are just a few. Examples of the blowing agents that produce these characteristics in the production of polystyrene foam would include the aliphatic hydrocarbons, and fully (or partially) halogenated hydrocarbons.

For polystyrene, for example, the $C_4$–$C_6$ alkanes have gathered widespread acceptance, especially pentane. Following a typical extrusion foaming step, the stock material is ordinarily aged before thermoforming into containers or the like. During aging, the foam cells and polymeric matrix become partially depleted of volatile hydrocarbons, which enter the atmosphere. However, potential atmospheric contamination by these by-products of foam manufacture has led workers to seek non-polluting alternative blowing agents, such as the usual atmospheric gases, e.g., nitrogen and carbon dioxide, and combinations of atmospheric gases with organic gases, e.g., the lower hydrocarbons or the freons.

In the prior art, both atmospheric gases, per se, and combinations of atmospheric and organic gases have been disclosed as blowing agents for alkenyl aromatic polymers.

Australian Patent Application No. 52724/79, published Canadian Patent Application No. 2,022,501 and published European Patent Application No. 0,411,923 all disclose blowing agents consisting of carbon dioxide for alkenyl aromatic or styrenic polymers. The resulting foamed products are said to be flexible and/or have improved tensile elongation properties. However, the production rates of the processes are generally low, on the order of less than 200 lbs./hr., and also have generally low post-expansion properties, on the order of 50% or less. In addition, these processes require relatively high extrusion temperatures, on the order of 130° C. to 155° C. Thus, these processes are not very economical.

In co-pending patent application Ser. No. 07/891,866, there are disclosed processes for producing polystyrene foams utilizing 100% of atmospheric gas, e.g. carbon dioxide and/or nitrogen, which can be effected at a much lower extrusion temperature, i.e. on the order of about 120° C., utilizing in the melted polymer an additive comprised of a masterbatch mix containing alpha-methyl polystyrene, a rubbery block copolymer, a solid blowing agent comprised of an encapsulated combination of monosodium citrate and sodium bicarbonate, white mineral oil, and silica.

U.S. Pat. Nos. 4,344,710 and 4,424,287 disclose blowing agents which are combinations of liquid carbon dioxide and liquid aliphatic, or fully (or partially) halogenated hydrocarbons. These patents state that the use of atmospheric gases, including 100% carbon dioxide or nitrogen as blowing agents has not been successfully employed, giving as a reason the extreme volatility of these gases, and further state that the use of these materials is said to produce corrugation and surface defects in the sheet product. These two patents disclose that a combination of atmospheric and organic gases, in an alkane: $CO_2$ feed ratio in the range of 3:1 to 1:1 by weight, can be used, with the total amount of blowing agent combination being in the range of 2.5 to 10 parts per 100 parts by weight of thermoplastic resin. As nucleating agents for the foamed products, the patents disclose the use of a mixture of sodium bicarbonate and citric acid. The process temperatures needed for extrusion of the foam are again quite high, on the order of 150° C.

U.S. Pat. No. 4,424,287 further discloses that the foams prepared with the combination of blowing agents exhibit the advantage of reduced atmospheric emissions upon aging without, however, any data to this effect, merely stating that the reduction in pollutant (i.e. the hydrocarbon blowing agents) is greater than the expected reduction due to the corresponding decrease in organic blowing agent use. The only rationale provided in U.S. Pat. No. 4,424,287 for the reduced hydrocarbon emissions is the ability of the foamed sheet product to be immediately thermoformed, thereby reducing the need for aging of the foamed sheet product.

U.S. Pat. No. 4,419,309 discloses the use of two foaming agents; the first being introduced into a molten thermoplastic resin under higher pressure, with the first foaming agent being selected from a low molecular weight aliphatic hydrocarbon, a low molecular weight halocarbon and mixtures thereof, and the second foaming agent being introduced under lower pressure, with the second foaming agent being selected from carbon dioxide, water vapor and mixtures thereof, to cause foaming of the melted thermoplastic resin. Again, the extrusion rates are low, on the order of 150 lbs./hr., and the extrusion temperatures are high, on the order of 290°–320° F.

United States Patent Nos. 4,916,166 and 5,011,866 disclose alkenyl aromatic thermoplastic synthetic resinous elongated foam bodies having a machine direction, a transverse direction and closed, non-interconnecting gas-containing cells, which are prepared using, preferably at least 70% by weight of 1,1-difluoro-1-chloroethane (U.S. Pat. No. 4,916,166) and requiring the use of at least 70% by weight of 1,1,1,2-tetrafluoroethane or 1,1,1-trifluoroethane, based on the total weight of blowing agent mixture weight (U.S. Pat. No. 5,011,866), and using as a second blowing agent up to 30 weight percent (of the blowing agent in an amount of mixture) chemical or physical blowing agents, including water, 1–4 carbon aliphatic hydrocarbons, carbon dioxide, or other hydrogen-containing chlorofluorocarbons (HCFCs) such as chlorodifluoromethane (HCFC-22).

U.S. Pat. No. 4,916,166 discloses that the amount of carbon dioxide is limited to no more than about 6% by weight and that extruded articles having densities between 2.4 and 5.0 pounds per cubic foot may be obtained only by extrusion at a die temperature of about 118° C. or less. The extrusion rate at this temperature should necessarily be quite low, although the patent is silent on this point. The specific examples of U.S. Pat. No. 4,916,166 show that extruded foam articles having densities of less than 2.4 pounds per cubic foot are obtained only upon extrusion above 118° C., and these are obtained utilizing blowing agents which contain only about 2.7% by weight carbon dioxide based upon 100% by weight of the blowing agent mixture.

U.S. Pat. No. 5,011,866 discloses alkenyl aromatic thermoplastic synthetic resinous elongated foamed products having densities of from about 1 to about 6 pounds per cubic foot which have a plurality of closed non-interconnecting gas-containing cells, with the limitation that the cells contain at least 70% by weight of either 1,1,1-trifluoroethane or 1,1,1,2-tetrafluoroethane. U.S. Pat. No. 5,011,866 likewise prefers the use of less than 6% carbon dioxide as a component in a blowing agent mixture although some examples show the use of about 9% carbon dioxide.

Thus, there still exists a need in the art for procedures for the production of alkenyl aromatic foams which utilize combinations of atmospheric and organic gases as blowing agents and having an increased amount of atmospheric gas, such as carbon dioxide or nitrogen. There also still exists a need in the art for such alkenyl aromatic foams which can be produced at increased temperatures and increased extrusion rates for a given density. Still further, there exists a need in the art for alkenyl aromatic foams having an increased percentage of closed, non-interconnected cell structure, increased post-expansion properties, and increased retainment of blowing agent within the cell structure of the alkenyl aromatic foam.

These and other needs still remaining in the alkenyl aromatic foam art are met and satisfied by applicants' present invention, described below.

SUMMARY OF THE INVENTION

In accordance with the present invention, there is provided a process for the production of alkenyl aromatic foams, said process comprising:

(a) heating an alkenyl aromatic resin to a temperature above its melting point to form a melted alkenyl aromatic resin;

(b) adding to the melted alkenyl aromatic resin a masterbatch mix comprised of:
  (i) encapsulated monosodium citrate and sodium bicarbonate;
  (ii) styrene-ethylene/butylene-styrene block copolymer;
  (iii) alpha-methyl polystyrene;
  (iv) white mineral oil; and
  (v) silica, to form an alkenyl aromatic/masterbatch mix blend;

(c) heating the alkenyl aromatic/masterbatch mix blend to a temperature sufficient to form a melted blend;

(d) injecting into the melted blend a non-solid blowing agent comprised of a combination of atmospheric gas and organic gas to form an injected melted blend;

(e) mixing the injected melted blend to form a mixed injected melted blend; and (f) cooling and extruding the mixed injected melted blend as an alkenyl aromatic foam.

In another embodiment of the present invention, there is provided an alkenyl aromatic foam composition comprised of:

(a) an alkenyl aromatic polymer;
(b) alpha-methyl polystyrene;
(c) styrene-ethylene/butylene-styrene block copolymer;
(d) white mineral oil;
(e) the decomposition products of an encapsulated monosodium citrate and sodium bicarbonate; and
(f) silica, wherein the foam is comprised of closed cells containing therein a combination of atmospheric gas and organic gas.

In still a further embodiment of the present invention, there is provided an extruded alkenyl aromatic foam having a density greater than 2.5 pounds per cubic foot, having been extruded at a die temperature of 120° C. or greater, and having a plurality of closed non-interconnected gas-containing cells therein, wherein the gas contained in the cells is comprised of a combination of atmospheric gas and organic gas and wherein the atmospheric gas is present in an amount of at least 30% by weight, based upon the total weight of the gas contained in the cells.

In a still further embodiment, the present invention provides for a process for the production of alkenyl aromatic foams having a density of greater than about 2.5 pounds per cubic foot, said process comprising:

(a) heating an alkenyl aromatic resin to a temperature above its melting point to form a melted alkenyl aromatic resin;

(b) adding to the melted alkenyl aromatic resin a masterbatch mix comprised of:
  (i) a styrene resin;
  (ii) a rubbery block copolymer; and
  (iii) a solid blowing agent to form an alkenyl aromatic/masterbatch mix blend;

(c) heating the alkenyl aromatic/masterbatch mix blend to a temperature sufficient to form a melted blend;

(d) injecting into the melted blend a non-solid blowing agent comprised of a combination of atmospheric gas and organic gas to form an injected melted blend, wherein the atmospheric gas is present in an amount of at least about 30% by weight based upon the total weight of atmospheric gas and organic gas;

(d) mixing the injected melted blend to form a mixed injected melted blend;

(e) cooling the mixed injected melted blend; and (f) extruding the cooled blend at a temperature not below 120° C. as an alkenyl aromatic foam.

In yet a still further embodiment of the present invention, there is provided an alkenyl aromatic foam having a density of greater than 6.0 pounds per cubic foot, having a plurality of closed, non-interconnecting gas-containing cells therein, wherein the gas contained in the cells is comprised of atmospheric gas and organic gas.

In yet another further embodiment of the present invention, there is provided a process for the production of alkenyl aromatic foams having a density of greater than 6.0 pounds per cubic foot, said process comprising:

(a) heating an alkenyl aromatic resin to a temperature above its melting point to form a melted alkenyl aromatic resin;

(b) adding to the melted alkenyl aromatic resin a masterbatch mix comprised of:
  (i) encapsulated monosodium citrate and sodium bicarbonate;
  (ii) styrene-ethylene/butylene-styrene block copolymer;
  (iii) alpha-methyl polystyrene;
  (iv) white mineral oil; and
  (v) silica, to form an alkenyl aromatic/masterbatch mix blend;

(c) heating the alkenyl aromatic/masterbatch mix blend to a temperature sufficient to form a melted blend;

(d) injecting into the melted blend a non-solid blowing agent comprised of a combination of atmospheric gas and organic gas to form an injected melted blend;

(e) mixing the injected melted blend to form a mixed injected melted blend;

(f) cooling the mixed injected melted blend; and (g) extruding the cooled blend as an alkenyl aromatic foam.

DETAILED DESCRIPTION OF THE INVENTION

The polyalkenyl aromatic polymers can be, for example, styrene polymers. The styrene polymers included in the compositions of the invention are homopolymers of styrene and copolymers and interpolymers of styrene containing a predominant proportion of styrene, e.g. greater than 50 weight percent, and preferably greater than 75 weight percent, styrene. Examples of monomers that may be interpolymerized with the styrene include alpha, beta-unsaturated monocarboxylic acids and derivatives thereof, e.g. acrylic acid, methyl acrylate, ethyl acrylate, butyl acrylate, 2-ethylhexyl acrylate and the corresponding esters of methacrylic acid, acrylamide, methacrylamide, acrylonitrile, methacrylonitrile, maleic anhydride, etc. If desired, blends of the styrene polymer with other polymers may be employed, e.g. blends of the styrene polymer with grafted rubbery diene polymers, or the analogous compositions obtained by dispersing a rubber diene polymer in the styrene monomer and, optionally, other monomers, and subsequently polymerizing the mixture. In any of the above type resins, all or a portion of the styrene may be replaced with its closely related homologues such as alpha-methylstyrene, o-, m-, and p-methylstyrenes, o-, m-, and p-ethylstyrenes, 2,4-dimethylstyrene, bromostyrene, chlorostyrene, and the like. Copolymers of alkenyl aromatic, e.g. styrene, and alkenyl nitrile, e.g., acrylonitrile can also be used and can have a weight ratio of styrene to acrylonitrile of 95:5 to 5:95 respectively.

The rubber-containing blends can have the diene rubber moiety present in amounts of about 1 to 35% of grafted diene rubber particles dispersed in a matrix polymer or copolymer as a polyblend. Generally, the rubber particles are grafted with the polymers having the same composition as the matrix phase. The diene rubbers can be polybutadiene or copolymer rubbers having at least 50% by weight of a diene monomer, e.g. butadiene, chloroprene, isoprene or pentadiene. Comonomers copolymerizable with the diene monomers can be those disclosed above. The copolymer rubbers may be interpolymers or block copolymers.

The masterbatch mix is a plasticizer which improves the flow characteristics of the foam.

The masterbatch mix comprises in its broadest aspects:
(a) a styrene resin;
(b) a rubbery block copolymer; and
(c) a solid blowing agent.

An essential element of the masterbatch mix is the styrene resin. All commercially available styrene polymers can be used as the styrene resin. However, it is preferable that the Vicat softening temperature of the chosen styrene polymer be between 45 and 82 at 50° C./hr. rise. Preferred as the styrene resin is alpha-methylstyrene. Commercially known alpha-methylstyrenes include Amoco's Resin 18-240, Resin 18-210 and Resin 18-290, the preferred being the Resin 18-240 which has a Vicat softening temperature of 60.5 at 50° C./hr. rise and 62.9 at 120° C./hr. rise.

The foregoing alpha-methylstyrenes have the following approximate physical characteristics:

Resin 18-240 is a linear homopolymer of alpha-methylstyrene having a molecular weight of about 685, a softening point of about 99° C., and a flash point of about 210° C.; Resin 18-210 is a linear homopolymer of alpha-methylstyrene having a molecular weight of about 790, a softening point of about 118° C., and a flash point of about 224° C.; and Resin 18-290 is a linear homopolymer of alpha-methylstyrene having a molecular weight of about 960, a softening point of about 141° C., and a flash point of about 246° C.

Another essential element of the masterbatch mix is the rubbery block copolymer. These are known in the art generally as having the formulae: A-B, A-B-A, A-B-A-B, and the like, including graft and radial block copolymers, as well as block copolymers containing other types of blocks, "C". These rubbery block copolymers of the above formulae generally contain a styrenic polymer as the "A" block, and generally contain a rubbery polymer, e.g. butadiene, ethylene/propylene, ethylene/butylene, isoprene, as the "B" block. Block "C", when present, may be either a second, different styrenic polymer from the "A" block or a second, different rubbery polymer from the "B" block, as the case may be. Preferred as the rubbery block copolymer in the masterbatch mix are those block copolymers available from Shell Chemical Company under the designations "Kraton G" and "Kraton D", such as Kraton D-1101, Kraton D-1102 Kraton D-1107, Kraton G-1650, Kraton G-1651, Kraton G-1652, Kraton G-1657X, Kraton G-1701X, and Kraton G-1726X. Especially preferred are Kraton G-1650 and Kraton G-1652.

The foregoing rubbery block co-polymers have the following approximate block and physical characteristics: a styrene-butadiene-styrene block copolymer having a styrene/rubber ratio of about 31/69 (Kraton D-1101); a styrene-butadiene-styrene block copolymer having a styrene/rubber ratio of about 28/72 (Kraton D-1102); a styrene-isoprene-styrene block copolymer having a styrene/rubber ratio of about 14/86 (Kraton D-1107); a styrene-ethylene/butylene-styrene block copolymer having a styrene/rubber ratio of about 29/71 (Kraton G-1650); a styrene-ethylene/butylene-styrene block copolymer having a styrene/rubber ratio of about 32/68 (Kraton G-1651); a styrene-ethylene/butylene styrene block copolymer having a styrene/rubber ratio of about 29/71 and a ring and ball softening point (ASTME 28-67, 10% by weight in Kaydol oil) of about 141° F. (Kraton G-1652); a styrene-ethylene/butylene-styrene block copolymer having a styrene/rubber ratio of about 13/87 (Kraton G-1657X); a styrene-ethylene/propylene block copolymer having a styrene/rubber ratio of about 37/63 (Kraton G-1701X); and a styrene-ethylene/butylene block copolymer having a styrene/rubber ratio of about 30/70 (Kraton G-1726X).

The solid blowing agents which can be used in the masterbatch mix are also known in the art and include mixtures of one or more solid organic acids, for example, oxalic acid, succinic acid, adipic acid, phthalic acid, and preferably citric acid; and an alkali metal carbonate or alkali metal bicarbonate, for example, sodium carbonate, potassium carbonate, and preferably sodium bicarbonate. The acid and carbonate and/or bicarbonate are generally used in alkali:acid equivalent ratios of from about 1:3 to about 3:1, acid to carbonate (and/or bicarbonate), and are preferably used in approximate stoichiometric amounts, i.e. about 0.7 to 1.3 alkali equivalents per acid equivalent, preferably about 0.9 to 1.1 alkali equivalents per acid equivalent. Especially preferred as the solid blowing agent of the masterbatch mix are combinations of monosodium citrate and sodium bicarbonate, preferably encapsulated in vegetable oil (i.e. a mixture of mono-, di-, and triglycerides), the amounts of monosodium citrate and sodium bicarbonate present preferably also as a stoichiometric mixture. The most preferred solid blowing agents are the SAFOAM P and SAFOAM FP powders, available from Reedy International Corporation, Keyport, N.J.

The masterbatch mix also preferably contain a lubricant/plasticizer. Suitable lubricant/plasticizers are known to those in the art and include paraffin oil, silicone oil, medium to long chain alkyl esters of phthalic acid or isophthalic acid, propylene oxide and/or mineral oil. Preferred as the lubricant/plasticizer in the masterbatch mix is white mineral oil.

Also preferably used in the masterbatch mix is a quantity of silica, which can either be incorporated into pellets of the masterbatch mix, or dusted over the surface thereof.

The masterbatch mix preferably comprises essentially about 1 to 20 weight percent of stoichiometric amounts of monosodium citrate and sodium bicarbonate encapsulated in vegetable oil (preferably a mixture of mono-, di-, and triglycerides), about 3 to 50 weight percent of styrene-ethylene/butylene-styrene block copolymer, about 20 to 80 weight percent of alpha methyl styrene, about 1 to 20 weight percent of white mineral oil and about 0.2 weight percent of silica (which acts as a nucleating agent and aides in maintaining the free flow capability of the masterbatch mix under long term storage conditions). Among the preferred masterbatch mixes of the present invention are those available from Reedy International Corporation which are sold under the trademarks SAFOAM P-20, SAFOAM FP-20, SAFOAM FP-40, SAFOAM P-50 and SAFOAM FP-50.

SAFOAM P-20 and SAFOAM FP-20 contain about 19.8% of an equimolar combination of monosodium citrate and sodium bicarbonate encapsulated in vegetable oil (SAFOAM P and SAFOAM FP, respectively) a combination of 14% mono-, 12% di-, and 72% triglycerides, 67.5% of alpha-methylstyrene (Amoco resin 18-240), about 10% of a combination of styrene-ethylene/propylene block copolymer (Shell Chemical Company, Kraton G-1726X) and styrene-ethylene/butylene-styrene block copolymer (Shell Chemical Company, Kraton G-1650), about 2.5% of white mineral oil, and about 0.2% of silica (predominantly present as a dusted coating on the outside of pellets made from the remaining ingredients). SAFOAM FP-40 contains about 38.8% of an equimolar combination of monosodium citrate and sodium bicarbonate encapsulated in vegetable oil (SAFOAM FP, available from Reedy International Corporation), 36.6% of alpha-methylstyrene (Amoco resin 18-240), 14.4% of styrene-ethylene/butylene-styrene block copolymer (Shell Chemical Company, Kraton G-1652), about 9.0% of white mineral oil and about 0.2% silica.

SAFOAM P-50 comprises about 54.8% of an equimolar combination of monosodium citrate and sodium bicarbonate encapsulated in vegetable oil (SAFOAM P, available from Reedy International Corporation), about 30.5% of alpha-methylstyrene (Amoco Resin 18-240), about 12% of styrene-ethylene/butylene-styrene block copolymer (Shell Chemical Company, Kraton G-1650), about 7.5% of white mineral oil, and about 0.2% of silica.

The masterbatch mix, when used, is present in an amount of about 0.001 to about 1.0% by weight, based upon the weight of the polyalkenyl aromatic resin, preferably is present in an amount of about 0.01 to about 0.035 weight percent, based upon the weight of the resin, and more preferably is present in an amount of about 0.02 to about 0.03% by weight, based upon the weight of the resin.

The non-solid blowing agent combination of the present invention is comprised of atmospheric gas and organic gas. The atmospheric gas and organic gas may be added or injected into the melt either as a blend, or concurrently, or sequentially. The non-solid blowing agent can also be added to the melt in either gaseous or liquid forms, or combinations thereof. The amount of non-solid blowing agent combination which can be added in the process of the present invention ranges from about 2 to about 20% by weight, based upon the weight of the resin. Preferably, non-solid blowing agent combination is added in an amount of about 3 to 10% by weight, based upon the weight of the resin and, more preferably, from about 4 to about 7% by weight, based upon the weight of the resin.

As atmospheric gases, there can be used any of the gases normally present in the atmosphere, such as carbon dioxide, nitrogen, argon, helium, or neon, with carbon dioxide and nitrogen being preferred. As the organic gases, there can be used: the $C_4$–$C_6$ alkanes, known to those skilled in the art, including butane, isobutane, pentane, neopentane, isopentane, and hexane; the chlorinated hydrocarbons (CHCs), such as methyl chloride, methylene chloride and methyl chloroform; chlorinated fluorocarbons (CFCs), such as trichlorofluoromethane (CFC-11), dichlorofluoromethane (CFC-12), 1,1,2-trichloro-1,2,2-trifluoroethane (CFC-113), 1,2,-dichloro-1,1,2,2-tetrafluoroethane (CFC-114), 1-chloropentafluoroethane (CFC-115), Halon-1211, -1301, and -2402; the hydrogen-containing chlorofluoro carbons (HCFCs), such as chloro difluoromethane (HCFC-22), 1,1-difluoro-1,1-chloroethane (HCFC-142b); and the hydrogen-containing fluorocarbons (HFCs), such as 1,1-difluoroethane (HFC-152a), 1,1,1,2-tetrafluoroethane (HFC-134a), 1,1,1,-trifluoroethane (HFC-143a) and (HFC-123). The atmospheric gas and organic gas can be present in any relative amounts, such as a ratio from 1 to 99 parts by weight atmospheric gas and 99 to 1 parts by weight organic gas. Preferably, the amount of atmospheric gas is present in an amount of greater than 30% by weight, more preferably present in an amount of greater than 40% by weight, and still more preferably present in an amount of about 50% by weight or more. Most preferably, the ratio of atmospheric gas to organic gas (based upon the weight of the combination) is from about 35/65 to about 65/35, preferably 40/60 to 60/40, and more preferably about 50/50.

The use of an extrusion process for the manufacture of alkenyl aromatic foam is typical, but is not required. Such a process includes a primary extruder, a blowing agent addition system, a secondary extruder, an annular die, a sheet cutter or slitter and a sheet gathering device. However, the use of this exact equipment set up is not required in the process of this invention.

In the preferred embodiments of the present invention, polystyrene foam is formed in a continuous process by delivering a well-mixed and uniform blend of styrenic polymer and masterbatch mix to the extruder throat. Masterbatch mix is preferably about 0.02 to 0.03% by weight of the styrenic polymer. Once in the screw, while being rotated at a controlled RPM, the blend or feed of styrenic polymer and masterbatch mix is heated to a temperature above the melting point of the blend, about 250° to 500° F. It is then delivered with the use of relatively stable pressure in the range of about 4000–6000 psi, to the point of injection. Here, an injection system delivers atmospheric gas, e.g. carbon dioxide in gas or liquid form, and/or nitrogen in gas form, or combinations thereof, into the melted feed. In combination with the atmospheric gas, and in a preferred embodiment sequentially with respect to the delivery of the atmospheric gas, the injection system delivers an organic gas, e.g. isopentane or HFC 152(a), into the melted feed.

Next, the injected melted feed is passed into a second extruder. This extruder is designed for maximum cooling capability. It is of larger capacity than the first extruder. In this extruder, a minimum of shear is desired. Minimum shear is achieved by keeping the screw's roof diameter constant. The injected melted feed is mixed in this second extruder and cooled.

The feed then exits this second extruder through a die at a temperature at or above 250° F., preferably between about 250°–290° F., and more preferably at a temperature of between about 250°–280° F. and a pressure of about 2,500–3,750 psi. The extruded material is stretched out over a cooling drum and drawn to the desired thickness. The polystyrene foam sheet is then slit and can be wound into large rolls.

The foams produced according to the present invention are characterized by having densities generally greater than about 2.5 pounds per cubic foot, more preferably greater than about 3.0 pounds per cubic foot, still more preferably greater than about 3.5 pounds per cubic foot, most preferably greater than about 4.5–5.0 lbs. per cubic foot, and especially preferably greater than about 6 pounds per cubic foot. On average, the density of the foams according to the present invention range between about 4 pounds per cubic foot and about 10 pounds per cubic foot, and more generally range from about 4 pounds per cubic foot to 6 pounds per cubic foot.

The foams produced according to the present invention are also characterized by having a substantial plurality of closed, non-interconnecting gas-containing cells. Generally, the number of such closed cells in the foams according to the present invention is greater than 50% of all of the cells present, preferably greater than 60%, more preferably greater than 70%, still more preferably greater than 80%, especially preferably greater than 90%, and most especially preferably greater than 95%. The gas contained in the closed cells is comprised of a combination of atmospheric gas and organic gas and, preferably, contains combinations of atmospheric gas and organic gas, based on the weight of atmospheric gas an organic gas in the cells, having the components and, in the ratios, described above for the non-solid blowing agents which are utilized according to the present invention. For example, a foam resulting from the process of the present invention may have a percentage of closed cells greater than 70%, within which there may be a combination of gases comprised of carbon dioxide and isopentane in a weight ratio of about 40/60 based on the total weight of carbon dioxide and isopentane.

The foams of the present invention are further characterized in that they retain the injected gas, and particularly the organic gas, to a much greater degree than the foams of the prior art. The retainment of the injected gas is believed to be a function of several parameters, including the solubility of the organic gas in the foamed polymer and the percentage of closed cells in the foam. It is also theorized that the use of the rubbery block copolymer in the masterbatch mix of the preferred embodiments of the present invention aids in blocking and retaining within the foamed polymer the carbon dioxide and any water vapor which may be present in the polymer. The percentage of retained gas in the foams according to the present invention generally coincides with the percentage of closed cells. Thus, the percentage of gas retained in the foams according to the present invention is generally greater than 50%, preferably greater than 60%, more preferably greater than 70%, still more preferably greater than 80%, especially preferably greater than 90%, and most especially preferably greater than 95%. The percentage of closed cells can be measured by a Beckman Pycnometer. Due to the increased gas retention of the foams according to the present invention, there is a concomitant increase in the thermoforming output for the produced foams. The thermoforming output (or speed at which the foams may be thermoformed into finished product) is a function of a number of factors as well, including cell uniformity and percentage of closed cells. The foams according to the present invention attain greater than 25% improvement in thermoforming output rate as compared to prior art foams and can attain a 35%, or 50%, or greater, improvement of thermoforming output rate.

Still further, the foams obtained through the use of the masterbatch mix according to the preferred processes of the present invention provides for other significant economic improvements. Specifically, the production (or throughput) rate of foams according to the present invention when a masterbatch mix is used in the process, and particularly when the preferred SAFOAM masterbatch mixes are utilized, is generally greater than 200 pounds of foamed product per hour, preferably is greater than 400 pounds of foamed product per hour, more preferably greater than 500 pounds of foamed product per hour, and most preferably greater than 700 or 800 pounds of foamed product per hour.

In addition, the foams of the present invention, because of the improved gas retention characteristics of the foams when the masterbatch mix is used, exhibit post-expansion characteristics which are likewise greatly improved. The foams according to the present invention which are made by processes which utilize the masterbatch mix, and preferably the SAFOAM masterbatch mix, exhibit post-expansion properties of greater than 200%, preferably greater than 250%, more preferably greater than 300%, most preferably greater than 350%, especially preferably greater than 400%, and most especially preferably greater than about 450 to 500%. This post-expansion improvement provides for the ability to use a much thinner starting foam product in the post-extrusion thermoforming process.

Another beneficial aspect of the use of the masterbatch mix according to the present process, and especially the SAFOAM masterbatch mix, is that it is possible to reduce by at least 5%, preferably at least 10%, and more preferably up to about 20% or more, the amount of organic gas utilized in the process, while maintaining the same density of the foamed product.

DESCRIPTION OF THE PREFERRED EMBODIMENTS

The following examples are intended to merely illustrate the present invention, which is not limited thereby or thereto.

EXAMPLE 1

A virgin polystyrene resin having a weight average molecular weight of about 310,000 and SAFOAM P50 in an amount of 0.25 parts per 100, based on 100 parts of resin weight were combined.

These ingredients were uniformly blended and were added to an extruder. The mix was heated to 426° F. and melted under an injection pressure ranging from 4250to 4300 psi. At this point, isopentane at 3.65% and carbon dioxide at 2.43% (both based on 100 parts resin weight) were delivered into the melt.

Next, the melt passed into a cooling extruder, cooled down to a die melt temperature of 274° F. and a die pressure of 2830 psi (die diameter 8") and extruded. The extruded material was stretched out over a cooling drum with a 24.9" diameter and drawn to the physical parameters listed below.

Percent of closed cells=98.5%

Post-expansion (1 hr. after extrusion)=285%

The polystyrene foam was extruded with the following process and physical parameters:

| Total Output | 825 lbs./hr. |
|---|---|
| Sheet Cross Sectional Thickness | .105" |
| Sheet Density | 3.8 lbs./ft.$^3$ |
| Blowing Agent Isopentane | $\frac{3.65 \text{ lbs.}}{100 \text{ lbs.}}$ polymer |
| $CO_2$ | $\frac{2.43 \text{ lbs.}}{100 \text{ lbs.}}$ polymer |
| This represents a ratio of 60% isopentane to 40% $CO_2$. | |
| Masterbatch P50 | $\frac{.25 \text{ lbs.}}{100 \text{ lbs.}}$ polymer |

After aging the foamed sheet for three days, it was passed through a thermoformer at 32 cycles per minute; forming meat trays with a bottom cross sectional thickness ranging from 0.165" to 0.170". The percentage of isopentane retained in the formed trays was 3.32 lbs., based on 100 lbs. of resin, giving an isopentane retention of 91.1%.

EXAMPLE 2

A virgin polystyrene resin having a weight average molecular weight of about 310,000 of SAFOAM P50 in an amount of 0.25 parts per 100, based on 100 parts of resin weight were combined.

These ingredients were uniformly blended and were added to an extruder. The mix was heated to 435° F. and melted under an injection pressure ranging from 4300 to 4370 psi. At this point, isopentane at 3.01% and carbon dioxide at 1.9% (both based on 100 parts resin weight) were delivered into the melt.

Next, the melt was passed into a cooling extruder, cooled down to a die melt temperature of 268° F. and a die pressure of 2490 psi (die diameter 8").

The extruded material was stretched out over a cooling drum with a 24.9" diameter and drawn to the physical parameters listed below.

Percent of closed cells=96.7%

Post-expansion (1.5 hr. after extrusion)=295%

Same extruded polystyrene foam with the following components:

| Total Output | 825 lbs./hr. |
|---|---|
| Sheet Cross Sectional Thickness | .095" |
| Sheet Density | 4.8 lbs./ft.$^3$ |
| Blowing Agent Isopentane | $\frac{3.01 \text{ lbs.}}{100 \text{ lbs.}}$ polymer |
| $CO_2$ Gas | $\frac{1.90 \text{ lbs.}}{100 \text{ lbs.}}$ polymer |
| This represents a ratio of 60% isopentane to 40% $CO_2$. | |
| Masterbatch P50 | $\frac{.25 \text{ lbs.}}{100 \text{ lbs.}}$ polymer |

After aging the foamed sheet for three days, it was passed through a thermoformer at 30 cycles per minute, forming large meat trays with a bottom cross sectional thickness ranging from 0.170% to 0.173%. The percentage of isopentane retained in the formed trays was 2.79 lbs., based on 100 lbs. of resin, an isopentane retention of 93.0%.

EXAMPLE 3

A virgin polystyrene resin having a weight average molecular weight of about 310,000 and recycled polystyrene having a weight average molecular weight of about 290,999 at amounts ranging about 9:1 (virgin:recycled) based on weight and SAFOAM P-50 in an amount of 0.23 parts per hundred, based on 100 parts of resin weight, were combined.

These ingredients were uniformly blended and added to an extruder. The mix was heated to 435° F. and melted under an injection pressure ranging from 4550 to 4600 psi. At this point, HFC-152a at 2.6% and carbon dioxide at 2.4% (both based on 100 parts by weight virgin plus recycled) was delivered into the melt.

Next, the melt was passed into a cooling extruder, cooled down to a die melt temperature of 284° F. and a die pressure of 3250 psi (die diameter 8") and extruded.

The extruded material was stretched out over a cooling drum with a 26.1" diameter and drawn to the physical parameters listed below.

Percent of closed cells=71.2%

Post-expansion (1.0 hr. after extrusion)=250%

After aging the foamed sheet for two days, it was passed through a thermoformer at 27 cycles per minute, forming large hinged food containers with a bottom cross sectional thickness ranging from 0.105% to 0.110%.

Same extruded polystyrene foam with the following components:

| Total Output | 725 lbs./hr. |
|---|---|
| Sheet Cross Sectional Thickness | .08" |
| Sheet Density | 5.2 lbs./ft.$^3$ |
| Blowing Agent HFCs 152A | $\frac{2.6 \text{ lbs.}}{100 \text{ lbs.}}$ polymer |
| $CO_2$ Gas | $\frac{2.4 \text{ lbs.}}{100 \text{ lbs.}}$ polymer |
| This represents a ratio of 52% HFC 152A to 48% $CO_2$. | |
| Masterbatch P50 | $\frac{.23 \text{ lbs.}}{100 \text{ lbs.}}$ polymer |

The present invention has been described with respect to the preferred embodiments. It is to be understood, however, that modifications and variations may be resorted to, without departing from the spirit and scope of the invention, as those skilled in the art would readily understand. These modifications and variations are considered to be within the scope of the appended claims.

All of the above-mentioned patents and publications are incorporated herein by reference.

What is claimed is:

1. A process for producing a closed-cell polymer foam, said process comprising subjecting a foamable polymer composition comprising: (a) a predominant proportion of an optionally rubber-reinforced alkenyl aromatic polymer; and an additive for (a) comprising: (b) alpha-methylstyrene; and (c) a rubbery block copolymer to a temperature sufficient to provide a molten polymer; mixing a blowing agent with said molten polymer; heating the mixture to a temperature and applying pressure such that the mixture does not foam; thereafter reducing the temperature of the mixture; and extruding the mixture.

2. A process according to claim 1, wherein the optionally rubber reinforced alkenyl aromatic polymer (a) is comprised of styrene.

3. A process according to claim 1, wherein the optionally rubber-reinforced alkenyl aromatic polymer (a) is comprised of a copolymer or interpolymer of styrene containing greater than 75 weight pent styrene.

4. A process according to claim 1, wherein the optionally rubber-reinforced alkenyl aromatic polymer (a) is comprised of a blend of styrene and a rubbery polymer.

5. A process according to claim 1, wherein the alpha-methyl styrene (b) has a Vicat softening temperature of between 45 and 82 at 50° C./hr. rise.

6. A process according to claim 5, wherein the alpha-methylstyrene (b) is selected from the group consisting of: a linear homopolymer of alpha-methylstyrene having a molecular weight of about 685, a softening point of about 99° C., and a flash point of about 210° C., a linear homopolymer of alpha-methylstyrene having a molecular weight of about 790, a softening point of about 118° C., and a flash point of about 224° C., and a linear homopolymer of alpha-methylstyrene having a molecular weight of about 960, a softening point of about 141° C., and a flash point of about 246° C.

7. A process according to claim 1, wherein the rubbery block copolymer (c) is selected from the group consisting of A-B, A-B-A, A-B-A-B, graft and radial block copolymers.

8. A process according to claim 7, wherein the rubbery block copolymer (c) is selected from the group consisting of: a styrene-butadiene-styrene block copolymer having a styrene/rubber ratio of about 31/69 (Kraton D-1101); a styrene-butadiene-styrene block copolymer having a styrene/rubber ratio of about 28/72 (Kraton D-1102); a styrene-isoprene-styrene block copolymer having a styrene/rubber ratio of about 14/86 (Kraton D-1107); a styrene-ethylene/butylene-styrene block copolymer having a styrene/rubber ratio of about 29/71 (Kraton G-1650); a styrene-ethylene/butylene-styrene block copolymer having a styrene/rubber ratio of about 32/68 (Kraton G-1651); a styrene-ethylene/butylene styrene block copolymer having a styrene/rubber ratio of about 29/71 and a ring and ball softening point (ASTME 28-67, 10% by weight in Kaydol oil) of about 141° F. (Kraton G-1652); a styrene-ethylene/ butylene-styrene block copolymer having a styrene/rubber ratio of about 13/87 (Kraton G-1657X); a styrene-ethylene/ propylene block copolymer having a styrene/rubber ratio of about 37/63 (Kraton G-1701X); and a styrene-ethylene/ butylene block copolymer having a styrene/rubber ratio of about 30/70 (Kraton G-1726X).

9. A process according to claim 8, wherein the rubbery block copolymer (c) is selected from the group consisting of: a styrene-ethylene/butylene-styrene block copolymer having a styrene/rubber ratio of about 29/71 (Kraton G-1650) and a styrene-ethylene/butylene styrene block copolymer having a styrene/rubber ratio of about 29/71 and a ring and ball softening point (ASTME 28-67, 10% by weight in Kaydol oil) of about 141° F. (Kraton G-1652).

10. A process according to claim 1, wherein the blowing agent comprises a mixture of (1) one or more solid organic acids and (2) an alkaline metal carbonate or alkaline metal bicarbonate.

11. A process according to claim 10, wherein the one or more solid organic acids is selected from the group consisting of oxalic acid, succinic acid, adipic acid, phthalic acid and citric acid.

12. A process according to claim 10, wherein the alkaline metal carbonate or alkaline metal bicarbonate is selected from the group consisting of sodium carbonate, potassium carbonate and sodium bicarbonate.

13. A process according to claim 10, wherein the alkali-:acid equivalent ratios are from about 1:3 to about 3:1.

14. A process according to claim 13, wherein the alkali-:acid equivalent ratio is from about 0.7:1 to 1.3:1.

15. A process according to claim 10, wherein the blowing agent is comprised of a combination of monosodium citrate and sodium bicarbonate.

16. A process according to claim 15, wherein the combination of monosodium citrate and sodium bicarbonate are encapsulated in vegetable oil and the alkali:acid equivalent ratio is from about 0.9:1 to about 1.1:1.

17. A process for producing a closed-cell polymer foam, said process comprising subjecting a foamable polymer composition comprising: (a) an optionally rubber-reinforced alkenyl aromatic polymer comprised of a copolymer or interpolymer of styrene-containing greater than 50 weight percent styrene; and an additive for (a) comprising: (b) alpha-methylstyrene; and (c) a rubbery block copolymer to a temperature sufficient to provide a molten polymer; mixing a blowing agent with said molten polymer; heating the mixture to a temperature and applying pressure such that the mixture does not foam; thereafter reducing the temperature of the mixture; and extruding the mixture.

18. A process for producing a closed-cell polymer foam, said process comprising subjecting a foamable polymer composition comprising: (a) an optionally rubber-reinforced alkenyl aromatic polymer; comprised of a blend of styrene and a rubbery polymer; and an additive for (a) comprising: (b) alpha-methylstyrene; and (c) a rubbery block copolymer to a temperature sufficient to provide a molten polymer; mixing a blowing agent with said molten polymer; heating the mixture to a temperature and applying pressure such that the mixture does not foam; thereafter reducing the temperature of the mixture; and extruding the mixture.

* * * * *